US007108650B2

(12) United States Patent
Marzano

(10) Patent No.: US 7,108,650 B2
(45) Date of Patent: Sep. 19, 2006

(54) PROCEDURE OF ATTACHING SHEETS AND PADDED ENVELOPE

(76) Inventor: Domenico Marzano, 25 Whiffletree Crescent, Woodbridge, Ontario (CA) L4L 3K1

( * ) Notice: Subject to any disclaimer, the term of this patent is extended or adjusted under 35 U.S.C. 154(b) by 0 days.

(21) Appl. No.: 10/494,617

(22) PCT Filed: Nov. 6, 2002

(86) PCT No.: PCT/CA02/01731

§ 371 (c)(1),
(2), (4) Date: May 4, 2004

(87) PCT Pub. No.: WO03/039981

PCT Pub. Date: May 15, 2003

(65) Prior Publication Data

US 2004/0265521 A1    Dec. 30, 2004

(30) Foreign Application Priority Data

Nov. 6, 2001    (GB)  ................................. 0126745.9

(51) Int. Cl.
B31B 49/04    (2006.01)
(52) U.S. Cl. ...................... 493/204; 493/210; 493/191; 156/257; 156/263; 156/308.4; 383/113; 206/522; 206/484
(58) Field of Classification Search ................ 493/917, 493/204, 210, 189, 190, 193, 194; 53/479, 53/480, 374.2; 156/256, 257, 263, 308.4, 156/309.6, 581, 583.1, 583.4; 383/107, 109, 383/113; 206/522, 484
See application file for complete search history.

(56) References Cited

U.S. PATENT DOCUMENTS

| 2,685,911 | A | * | 8/1954 | Haller | 428/184 |
| 3,868,287 | A | * | 2/1975 | Lewyckyj | 156/201 |
| 3,948,436 | A | * | 4/1976 | Bambara | 206/523 |
| 4,011,798 | A | * | 3/1977 | Bambara et al. | 493/240 |
| 4,088,264 | A | * | 5/1978 | Vogt | 383/111 |
| 4,285,998 | A | * | 8/1981 | Thibodeau | 383/119 |
| 4,353,770 | A | * | 10/1982 | Kuckhermann | 156/308.4 |
| 5,273,361 | A | * | 12/1993 | Jillson | 383/93 |
| 5,346,312 | A | * | 9/1994 | Mabry et al. | 383/113 |
| 5,520,621 | A | * | 5/1996 | Edenbaum et al. | 602/8 |
| 5,727,686 | A | * | 3/1998 | Kristal | 206/459.1 |
| 5,728,037 | A | * | 3/1998 | Pryor et al. | 493/217 |
| 6,454,500 | B1 | * | 9/2002 | Shetty | 410/119 |

FOREIGN PATENT DOCUMENTS

JP    08-291565    * 11/1996

* cited by examiner

Primary Examiner—Hemant M. Desai
(74) Attorney, Agent, or Firm—Anthony Asquith Corp.

(57) ABSTRACT

The envelope comprises layers of plain un-coated kraft paper and of bubble-wrap polyethylene. A stack of the layers is joined at the marginal edges of the envelope by squeezing the stack between a pair of points-dies, which are formed with points that puncture the kraft paper but do not puncture the polyethylene. The points push crowns of un-punctured polyethylene through the punctured boles in the paper. Then, the marginal edges are squeezed flat between flat-dies, the flat-dies being heated enough to cause fuse-bonding. The margins of the finished envelope are held together not only by fuse-bonding, but by the presence of the crowns, which, penetrating right through the holes in the paper, serve as mechanical rivets.

27 Claims, 7 Drawing Sheets

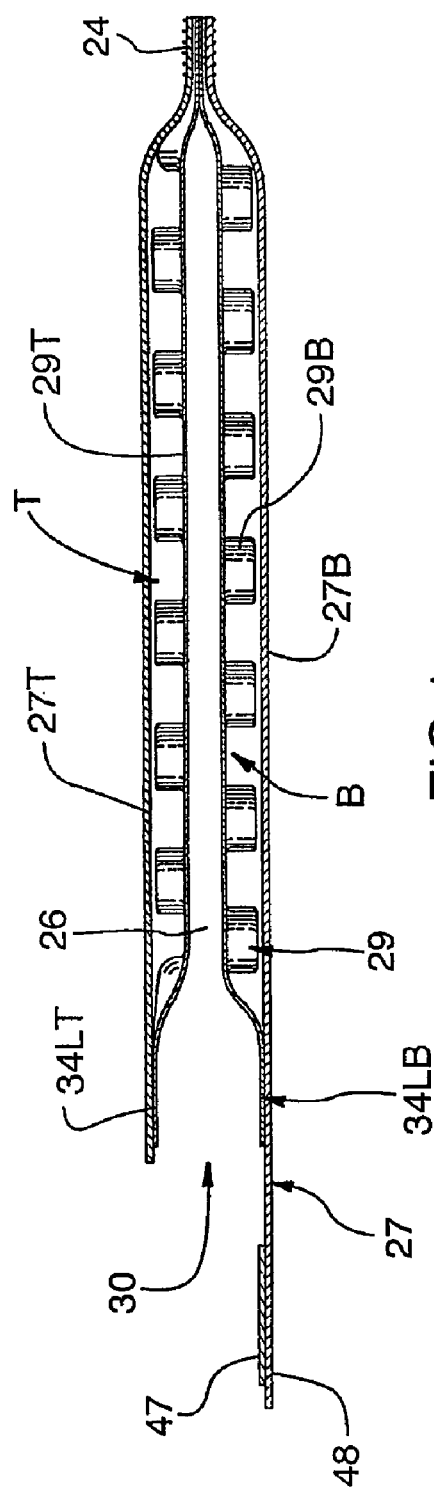
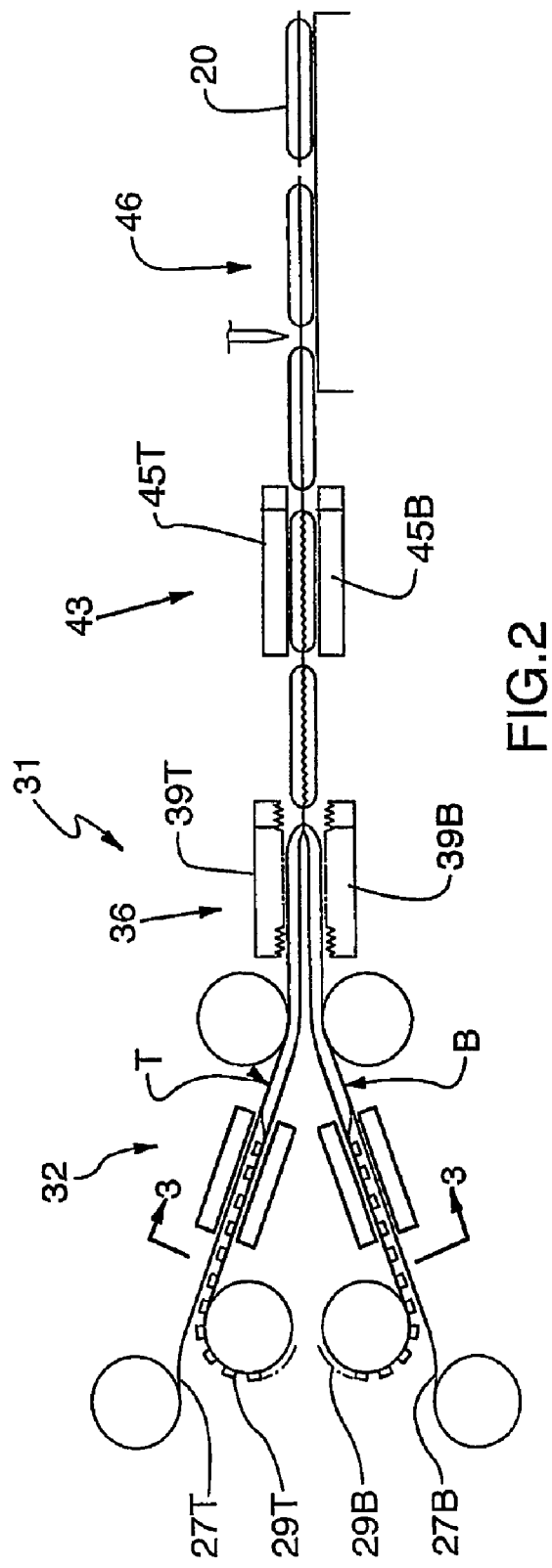
FIG.1a
FIG.2

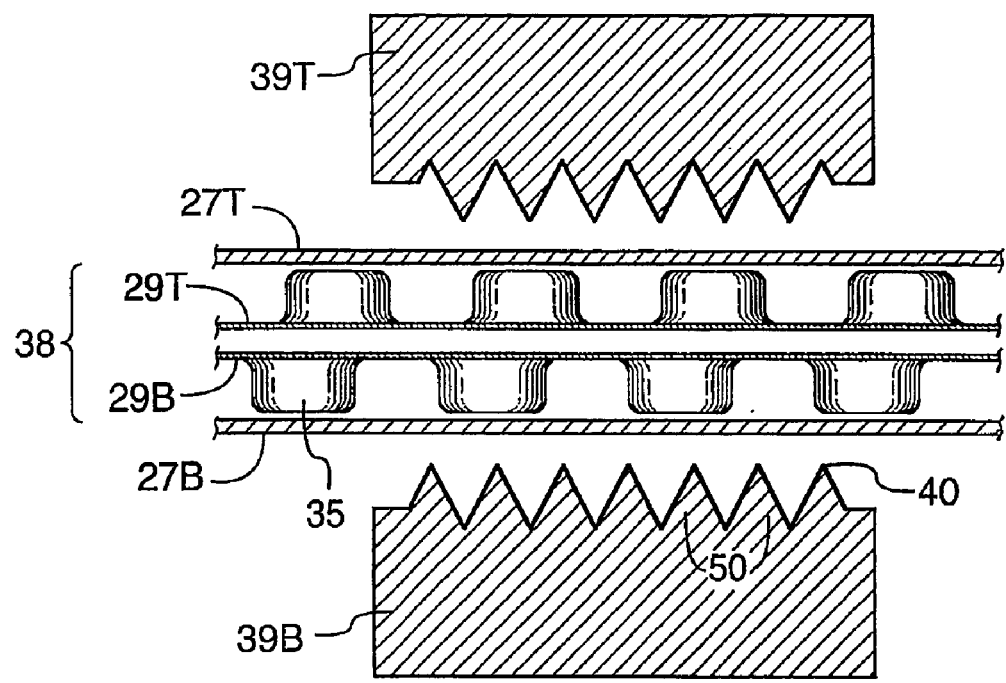
FIG. 5
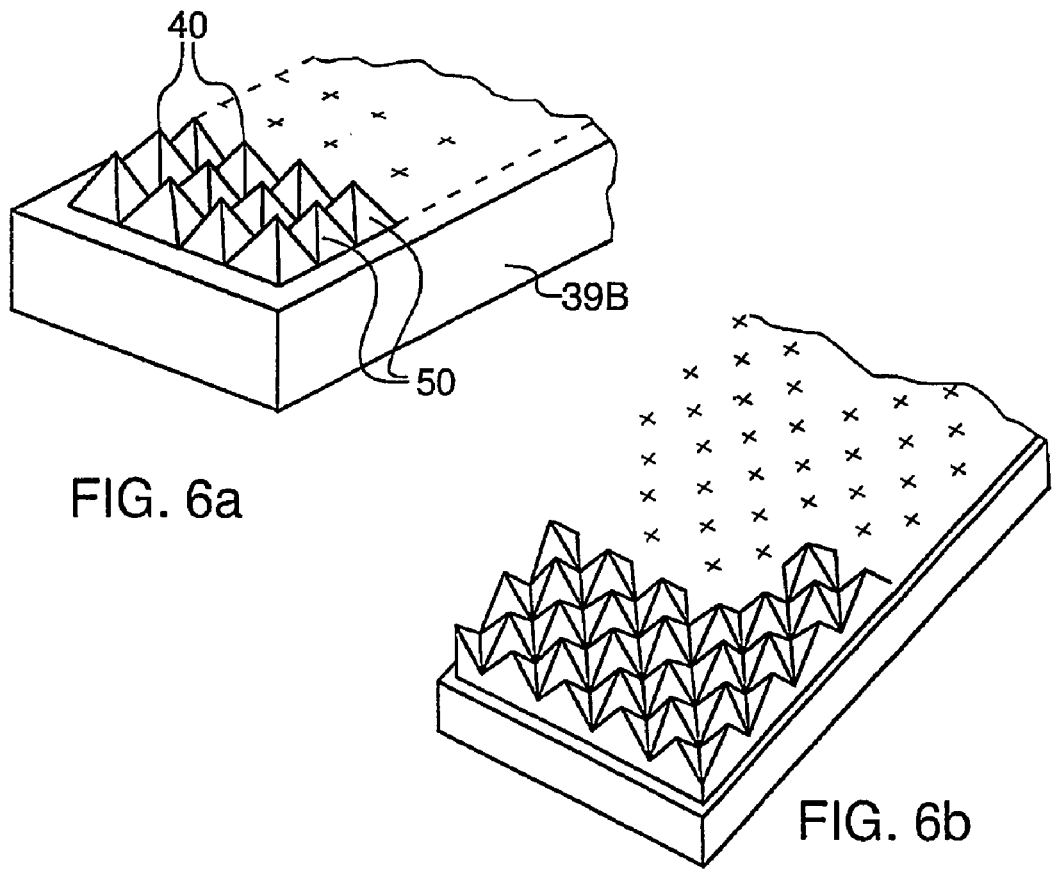
FIG. 6a
FIG. 6b

PROCEDURE OF ATTACHING SHEETS AND PADDED ENVELOPE

This application is a 371 of PCT/CA02/01731, filed on Nov. 06, 2002.

This invention relates to padded envelopes, being envelopes that have an outer covering of paper, and an inner lining of plastic bubble material. Plastic bubble-wrap is a well-known, widely-used, packaging material, and comprises a flat-layer of a thin plastic, such as polyethylene (polythene), and a bubble-layer of thin plastic, which is partially laminated to, and partially separated from, the flat-layer. The areas of separation of the layers are isolated from each other, being completely surrounded by the laminated areas, to form the bubbles.

BACKGROUND TO THE INVENTION

In bubble envelopes, the flat-layer of the bubble material forms the inside lining of the envelope, and is contacted directly by items placed in the envelope, and the paper (usually, kraft paper) forms the outside of the envelope.

With the traditional bubble padded envelopes, a problem can arise regarding recycling of the envelopes, and regarding the re-use of the materials from which the envelopes are made. The problem has been that, if the bubble material was adhered to the paper strongly enough to provide a serviceably-robust structure, it was not possible to physically separate the bubble material from the paper, so that the different materials could be recycled.

Proposals have been made to attach the bubble material to the paper in such a way as to permit separation for recycling, but these proposals have been very expensive, or not mechanically satisfactory, or have involved the use of applied adhesives, which require the use of sophisticated handling and positioning machinery.

The invention is aimed at providing a bubble padded envelope, in which the bubble material is attached to the paper in a manner that is satisfactory from the service or usage standpoint, and which permits the bubble material to be readily separated from the paper, for recycling.

It is also an aim of the invention to provide a manner of making a padded envelope, which provides a serviceably robust envelope structure, by a simple manufacturing procedure that requires a minimum of costly preparation of the envelope components.

THE INVENTION IN RELATION TO THE PRIOR ART

An example of a prior design of bubble-padded envelope is shown in patent publication U.S. Pat. No. 6,139,188 (Marzano, 2000)

In one traditional design of bubble envelope, the paper and the bubble material were first attached face to face over the whole area of the bubble material. In order to enable the polyethylene bubbles to stick to the paper, the paper had to be itself coated with a thin layer of polyethylene, over its whole surface. Then, as a preliminary production step in the manufacture of the envelopes, the bubble material was placed against the coated side of the paper, bubble-tips touching the paper, under conditions of heat and (slight) pressure, whereby the tips of the bubble became attached to the paper. In this traditional manufacturing system, only when the paper had been coated, and the bubble material then stuck face-to-face over the coated paper, could manufacture of the envelopes be commenced.

Envelopes manufactured by this traditional system, however, though very robust and serviceable, could not be recycled because the polyethylene cannot later be separated from the paper. Also, this system involved impregnating a coating of polyethylene into the kraft paper, prior to making the envelopes, which generally was carried out in a separate factory from the manufacture of the envelope, and that could sometimes lead to inventory inefficiencies, etc.

It should be understood that, in the above-described traditional system, the securement of the bubble material to the coated paper, to form a layered composite, occurs over the whole interface between bubbles and paper. That is to say, the tip of every bubble adheres to the paper. It is not practical for the bubbles to be adhered to the paper over only a narrow band. The system provides that the bubble tips are secured very firmly to the pre-coated paper, but the disadvantage is that the bubble material cannot later be removed from the paper for recycling.

It may be noted that polyethylene cannot be reliably bonded to un-coated paper, simply by squeezing the polyethylene against the paper between heated dies. The polyethylene will bond a little, but not enough to be suitable for the manufacture of envelopes. Rather, the paper first has to undergo the pre-coating process, which leaves a thin film of polyethylene on the paper, in which case the polyethylene bubbles adhere to the paper such that the two materials cannot later be separated.

It is also known, for example from DE-4,343,798, to provide an additive to be included in the bubble material, which can be activated to cause the bubbles to adhere to the paper. Thus, the bubble material may be attached to un-coated paper, and this can be done by activating the additive over pre-determined narrow bands. This allows the bubble material to be attached to the paper over only the outer margins that make up the envelope. The bubbles are not attached to the paper over the majority of the surfaces that comprise the envelope. This system can produce satisfactory results, in that the envelopes are serviceable, yet the envelopes can be torn apart, after use, and the paper and bubble material separated for recycling. However, the system is expensive, and prone to manufacturing difficulties.

The invention is also aimed at providing an envelope in which the bubble material is attached to the paper only at the edges or margins of the envelope. Thus, again, the bubble material may be separated from the paper for recycling after use. But the invention provides a manner of attaching the bubble material to the paper in such a manner that no pre-coating of the paper is needed, nor adhesives, nor other items that can lead to production difficulties.

The invention is aimed at providing a manner of attaching the bubble material to the paper in a manner that is predominantly a mechanical interaction between the paper and the bubble material, rather than a chemical adhesive interaction. In the invention, the aim is to enable padded envelopes to be made using, as starting materials, a roll of inexpensive plain un-coated paper and a roll of plain bubble material, and to attach the two materials to form an envelope configuration, by a simple clean production process. It is an aim of the invention that no adhesives or additives be required.

GENERAL FEATURES OF THE INVENTION

In one aspect, the invention lies in a procedure, as claimed, for joining a sheet of paper to a sheet of plastic bubble-wrap material. More particularly, the invention lies in a procedure, as claimed, for manufacturing a padded envelope. In another aspect, the invention lies in an envelope that has been manufactured by that procedure.

DETAILED DESCRIPTION OF PREFERRED EMBODIMENTS

By way of further explanation of the invention, exemplary embodiments of the invention will now be described with reference to the accompanying drawings, in which:

FIG. 1a is a sectioned side-elevation of the envelope of FIG. 1.

FIG. 2 is a diagram of production apparatus used for manufacturing the envelope of FIG. 1.

FIG. 5 is an elevation showing a stack of layers and showing a pair of points-dies of the apparatus of FIG. 2, prior to the points-dies being brought together onto the stack.

FIG. 6a is a pictorial view of one of the points-dies of the apparatus of FIG. 2.

FIG. 6b is a pictorial view like that of FIG. 6a, but showing a diagonal arrangement of points.

The apparatuses and procedures shown in the accompanying drawings and described below are examples which embody the invention. It should be noted that the scope of the invention is defined by the accompanying claims, and not necessarily by specific features of exemplary embodiments.

Figure 1:
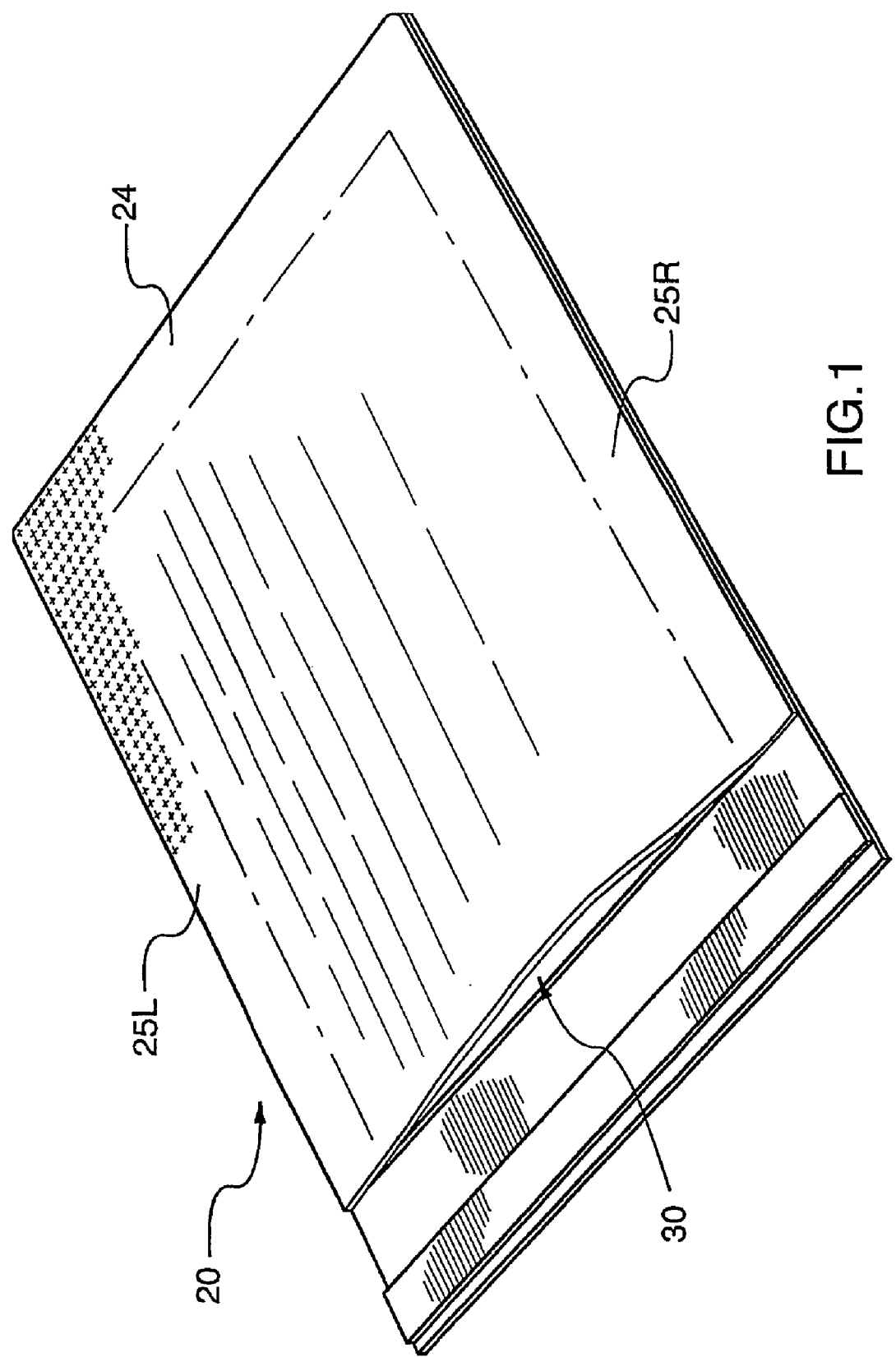
FIG. 1 is a pictorial view of a padded envelope that embodies the invention.

The padded envelope 20 of FIGS. 1 and 1a comprises a top T and a bottom B, which are secured along their marginal far edge 24, and along their marginal left and right side edges 25L,25R, to create a pocket 26. The top T comprises an outer layer 27T of kraft paper 27, and an inner layer 29T of polyethylene bubble-wrap material 29. The bottom B similarly comprises an outer layer 27B of the kraft paper 27, and an inner layer 29B of the polyethylene bubble material 29.

Typically, the kraft paper is about a hundred microns thick, and the polyethylene film from which the bubble-wrap material is made is about fifty microns thick. Typically, the bubbles have a diameter of eight mm, are spaced on a hexagonal grid with a ten mm centre-to-centre distance, and the bubbles stand four mm high.

At the mouth of the pocket 26, the bubble layer 29T is adhered to the paper layer 27T, and the bubble layer 29B is adhered to the paper layer 27B, whereby the mouth 30 of the pocket comprises an opening between the top bubble-layer 29T and the bottom bubble-layer 29B.

Figure 3:
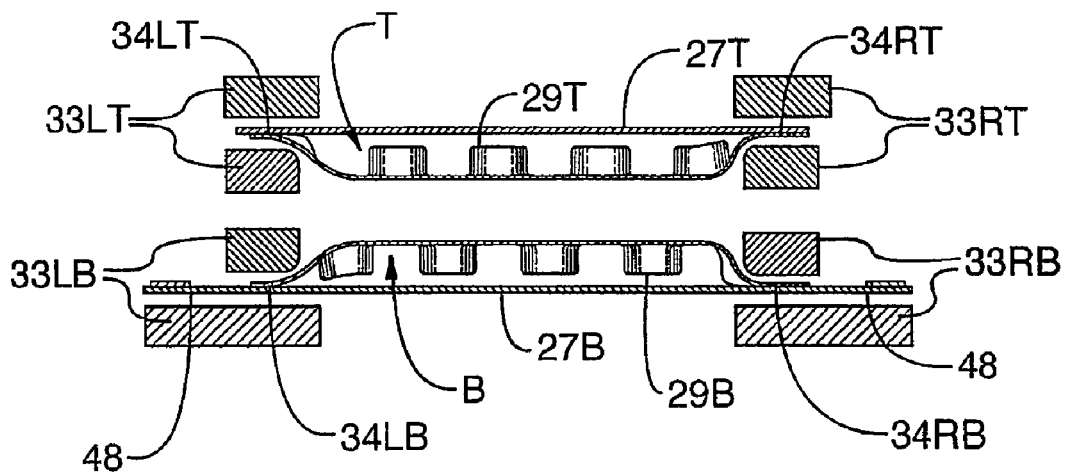
FIG. 3 is a cross-sectioned end-elevation in the direction of arrows 3—3 of FIG. 2.

Some of the stages in the manufacture of the envelope are illustrated in FIG. 2. The manufacturing apparatus 31 includes a first station 32 (see also FIG. 3), at which the left and right edges of the top layer 27T of paper are hot-pressed onto the left and right edges of the top layer 29T of bubble, using heated dies 33LT,33RT, whereby the bubbles 35 are squashed flat, and the polyethylene adheres to the paper, to form bonded margins 34LT,34RT. Also, the left and right edges of the bottom layer 27B of paper are hot-pressed onto the bottom layer 29B bubble, using heated dies 33LB,33RB, whereby the bubbles of the bottom layer 29B are squashed flat, and the polyethylene adheres to the paper, to form bonded margins 34LB,34RB.

These margins 34LT,34RT,34LB,34RB will later form the lips of the mouth 30 of the pocket 26. Again, it should be noted that the security level of the kind of adherence that arises from simply hot-pressing polyethylene onto un-coated paper is not very high, but in fact the adherence only needs to be adequate for the task of keeping the mouth of the pocket open, and hot-pressing onto un-coated paper is enough for that.

The top layers 27T,29T are kept separate from the bottom layers 27B,29B, while being processed in the first station 32. The two top layers emerge from the first station joined at the marginal edges 34LT,34RT but not joined over the rest of the area of the layers. Similarly, the two bottom layers move forward to the second station, joined just at the marginal edges 34LB,34RB. The two top layers 27T,29T and the two bottom layers 27B,29B advance separately to the second station 36.

Figure 4:
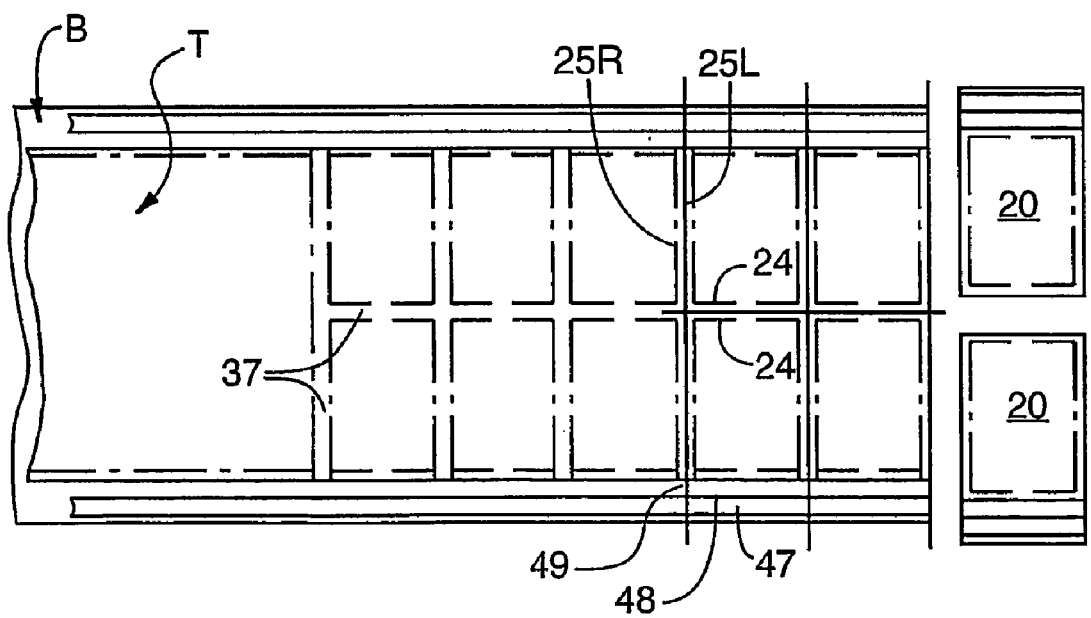
FIG. 4 is a plan view of a stack of layers as it passes through the apparatus of FIG. 2.

At the second station 36, the top layers 27T,29T of paper and bubble are joined to the bottom layers 27B,29B of paper and bubble, the areas of the joints being arranged in bands, which will later correspond to the marginal edges of the manufactured envelopes. FIG. 4 shows the configuration of the joint-bands 37 in plan view.

FIG. 5 is a view showing the stack 38 of layers, comprising top paper 27T—top bubble 29T—bottom bubble 29B—bottom paper 27B. Also shown is a pair of dies 39T,39B. Both dies are formed with points 40. FIG. 6a is a pictorial view of one of the points-dies 39B.

When the points-dies are brought together, the stack 38 of layers is trapped therebetween. As the dies come together, the bubbles 35 located between the dies are squashed flat. The portion of the stack trapped between the points-dies is then forced to follow the contours of the points 40.

It is a characteristic of paper, including the kraft paper 27 from which padded envelopes are made, that when a point is pressed into a sheet of paper, the paper can stretch resiliently to only a very limited extent. The paper will easily tear, i.e will be punctured, if a sharp point is pressed into the paper. Paper can stretch resiliently to only a limited extent. Paper does have a yield point, in that, if slightly over-stressed, paper will take a permanent set, without tearing. But it does not take much extra stress, beyond that, for paper to tear.

Polyethylene, including the polyethylene from which bubble material 29 is made, on the other hand, has a much larger capacity than paper, when over-stressed, to yield, and to carry on yielding, without puncturing.

It is recognised that, when a point is pressed into the stack 38 of layers of paper and polyethylene, the effect is that the paper layers become punctured; the polyethylene layers yield, and become stretched, but the polyethylene is not punctured. It is recognised that each point 40, if configured properly, can be arranged to push a crown of un-punctured polyethylene right through the hole the point has punctured in the paper.

Figure 7:
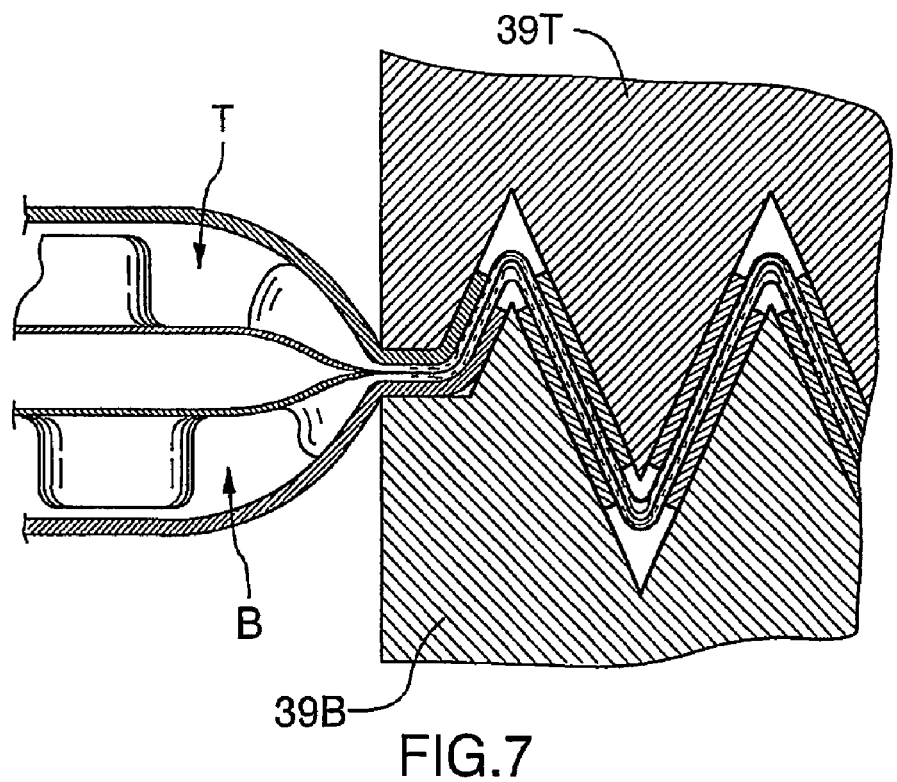
FIG. 7 is a close-up showing a portion of the stack, as squeezed between the points-dies.

In the condition as illustrated in FIG. 7, the points 40 on the points-dies 39T,39B have punctured holes right through the top and bottom layers 27T,27B of paper. The points have stretched the top and bottom layers 29T,29B of polyethylene beyond yielding, but have not punctured the polyethylene.

Figure 8:
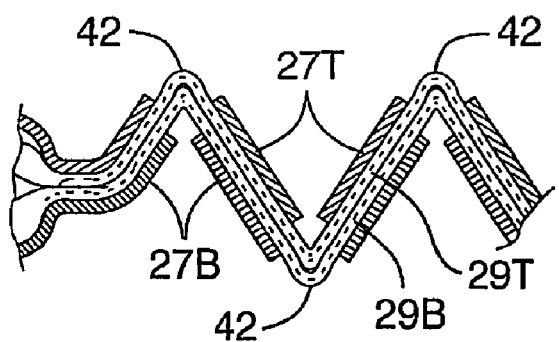
FIG. 8 is the same close-up as FIG. 7, but after the points-dies have been withdrawn from the stack.

FIG. 8 illustrates the condition of the stack when the points-dies 39T,39B are withdrawn. A small crown 42 of over-stretched polyethylene protrudes through the paper. If the FIG. 8 stack is held up to the light, points of light should be seen through the stack, indicating that the paper has been punctured; but, to repeat, only the paper has been punctured, not the polyethylene.

Figure 9:
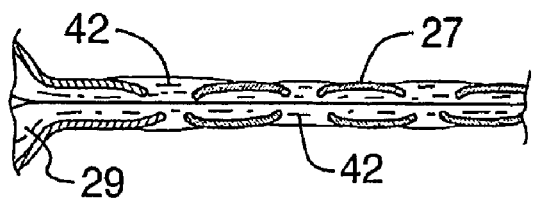
FIG. 9 is a close up of the same portion as FIGS. 7 and 8, but after the stack has been squashed flat by flat-dies of the apparatus of FIG. 2.

The stack 38 is now transferred to the third station 43 (FIG. 2). In this station, the stack is pressed between two flat-dies 45T,45B. These dies simply squash the FIG. 8 stack flat. The crowns 42 are compressed, from the outside of the paper, down onto the paper. Thus the crowns serve as mechanical rivets, holding the paper firmly secured to the polyethylene. Now, the condition of the squashed stack is as illustrated in FIG. 9.

The flat-dies 45T,45B are supplied with heat, and apply heat to the polyethylene, to the extent that the polyethylene is heated beyond its thermoplastic limit. When it cools, the polyethylene acquires the FIG. 9 shape permanently. As a result, the stack of paper and polyethylene layers is held together securely, by a combination of fuse-bonding and mechanical interaction.

At the cutting station, or fourth station 46, the envelopes are finished by cutting out, along the cut-lines 49 as indicated in FIG. 4. Also, strips 47 of press-to-stick adhesive are applied to the flaps 48.

The points 40 on the points-dies 39T,39B, as shown in FIG. 6a, comprise pyramids 50, which are relatively easy to manufacture, being formed by grinding grooves in a solid slab of metal. The pyramids are pitched on a square grid, at around two or three millimetres apart. The tips of the pyramids are sharp, as are the four side edges of the pyramids.

Figure 10:
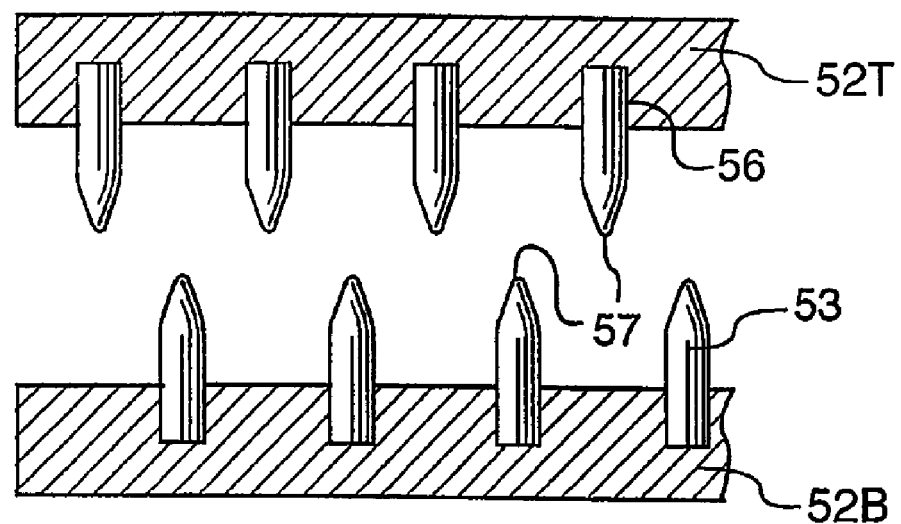
FIG. 10 is an elevation showing an alternative construction of the points-dies.

Alternatively, as shown in FIG. 10, the points-dies 52T, 52B may include needles. The needles 53 are manufactured separately from the slab 54 of the die, and pressed into sockets 56 therein. The needles 53 again form a square grid, pitched at around two or three mm apart. The tips 57 of the individual needles preferably are not sharp, but have a radius of ½ or ¼ mm. A very sharp point on the tip 57 might lead to the unwanted puncture of the polyethylene, whereas the radiused tip can stretch the polyethylene as much as ten mm before puncture. On the other hand, the radiused tip is almost the equal of a sharp tip when it comes to puncturing the paper.

It may be noted that, in regard to the pyramids-style points-dies 39T,39B of FIG. 6a, the pyramids of the top die 39T are an exact fit to the pyramids of the bottom die 39B. Thus, when the points-dies 39T,39B are brought together, the whole surface area of the stack 38 is squeezed and compressed between the dies. That is to say, as the points 40 of the pyramids penetrate the paper, and drive the crowns 42 of polyethylene through the holes in the paper, the rest of the stack of layers around the points is squashed flat.

As shown in FIG. 6b, the points may alternatively be arranged in diagonal rows.

But it is not essential that the area of the stack around the points be squashed flat by the points-dies, as happens with the pyramids-style of points-die, since the flat-dies 45T,45B will squeeze the stack flat. The needles-style of points-die 52T,52B leaves the area of the materials immediately surrounding the points un-compressed, which can be an advantage in that the polyethylene can then the more easily flow into the crowns without being over-stretched. Various configurations are contemplated, of sharp points or rounded points, of a one-piece die or needles let into sockets, of relief around the points or the dies closing together over the whole are, and the like. The cost of making the dies is one factor, and the quality of the finished envelopes is another.

The use of the needles-style of points-die 52T,52B may be expected to create larger crowns, i.e larger buttons of polyethylene that have been punched right through the paper to the other side of the paper, than the pyramids-style of points-die 39T,39B. Again, in FIG. 10, the stack of layers is squeezed flat between heated flat-dies 45T,45B, after the stack has been separated from the points-dies.

Figure 11:
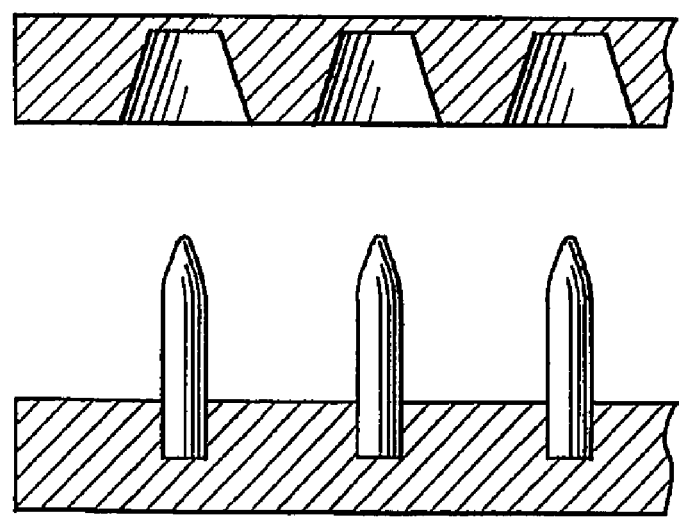
FIG. 11 is a corresponding elevation showing another alternative construction of the points-dies.

It is essential that the points puncture right through the paper, but it is not essential that half the points penetrate through from one side, and half from the other side, in the symmetrically alternating up/down manner as illustrated in FIG. 7. All the punctures may be from one side, if the designer wishes to arrange the dies that way. A needles-type points-die, in which the needles press only from one side, is shown in FIG. 11.

The punctures through the paper must be in the form of small points, each of which is surrounded by un-ruptured paper. It would not be acceptable for the paper to be punctured along a continuous line, for instance, because that would mechanically weaken the material. Similarly, the punctured points should not, in the finished envelope, form a line of perforations, whereby the envelope might easily be torn along that line.

If just one, or a few, of the points were to puncture, i.e make a hole right through, the polyethylene, that would not matter in itself; however, generally, for the security of the envelope, the polyethylene should not be punctured, and the presence of even one puncture might indicate that an inadequate margin of tolerance had been provided.

The dies 45T,45B;39T,39B;52T,52B as depicted herein have been in the form of flat slabs. In use, the stack 38 of layers is advanced through and between the dies, and then the movement of the stack is halted, and the dies are brought together and pressed onto the now-stationary stack. After the dies are separated, the stack is then advanced to the next station. The cycle time for drawing the stack forward is dictated by the length of time it takes to ensure that the polyethylene reaches its thermoplastic temperature, in the flat-dies station (i.e the third station 43).

The points-dies 39T,39B;52T,52B may be heated (in the second station 36). This enables the overall cycle-time to be reduced, in that the time the stack must spend between the flat-dies 45T,45B (in the third station 43) can be reduced, since the materials in the stack are pre-heated before reaching the third station.

Rather than being in the form of flat slabs, the dies may be in the form of rollers. In that case, the stack may be passed through the rollers without the cyclic stopping that is required when the dies are flat slabs. It may be noted that the term "flat" in the flat-dies refers to the effect of the dies in squashing the stack flat, not in the shape of the dies. Thus, the flat-dies may actually be rollers.

Similarly, the flat-dies may have the effect of impressing the whole area of the margin with, for example, an overall rounded-corrugated form (e.g corrugated in the view of FIG.

9), and still have the effect of squashing the crowns flat onto the outside surfaces of the paper, as required in the invention.

As shown, the far end 24 of the envelope 20 is made in the same manner as the side-edges 25L,25R, i.e by squeeze-bonding the joint-bands 37. The joint-bands 37 should be about two cm wide, whereby the bonded margin at the edges 24,25L,25R of the finished envelope each have a width of about one cm, when the envelopes are cut or stamped out, at the fourth station 46, along the cut-lines 49.

Alternatively, the designer may prefer to form the far edge 24, not by squeeze-bonding, but simply by folding the layers over, whereby the top and bottom layers 27T,27B of paper are formed from a single folded-over sheet of paper, and the top and bottom layers 29T,29B of polyethylene are formed from a single folded-over sheet of polyethylene, and the squeeze-bonding occurs just at the left and right edges 25L,25R. This manner of forming the end of an envelope is depicted in the said U.S. Pat. No. 6,139,188, for example. Of course, folding the edge 24 requires sophisticated fold-making machinery.

As mentioned, the preferred application of the materials jointing system described herein is in making padded envelopes from polyethylene bubble-wrap and kraft paper. However, padded envelopes can be made from other materials. For example, the polyethylene bubble-wrap may be replaced with expanded polyethylene foam. Being polyethylene, such expanded foam material again is thermoplastic, and has a great resistance to being punctured.

Many other plastic materials have the capacity to be heated beyond a thermoplastic limit and to regain mechanical properties upon cooling, and have also the ability to become stretched rather than to puncture, when stressed by a sharp point, such a polypropylene, nylon, etc. These materials may be considered for use in the invention, in which the main requirement is that un-punctured crowns of the thermoplastic film material can be pressed through punctured holes in the other material, and the crowns can then be heat-bonded to the punctured material.

Also, in the broad scope of the invention, the thermoplastic material need not be in bubble form, or expanded form, but may be in the form of just a single sheet or film.

The puncture-able material may be other than paper. The main characteristic required in this other material is that it be capable of being punctured when pressed by a sharp point. The material may be a fabric or cloth, for example; or the material may be a metal foil, for example aluminum foil. Some speciality envelopes are made now using cloth or aluminum foil.

As described above, a bubble envelope comprised layers of plain un-coated kraft paper and of bubble-wrap polyethylene. A stack of the layers was joined at the marginal edges of the envelope by squeezing the stack between a pair of points-dies, which were formed with points that punctured the kraft paper but not the polyethylene. The points pushed crowns of un-punctured polyethylene through the punctured holes in the paper. Then, the marginal edges were squeezed flat between flat-dies, the flat-dies being heated enough to cause fuse-bonding. The margins of the finished envelope were held together not only by fuse-bonding, but by the presence of the polyethylene crowns, which, penetrating right through the holes in the paper, serve as mechanical rivets. This technique is termed the pierce-and-fuse technique.

It is recognised that the pierce-and-fuse technique, as disclosed in the prior patent application in respect of the bubble padded envelope, can be utilised in respect of other packaging categories. In one example, the technique is used to join kraft paper to a planar film of polyethylene or other thermoplastic material, i.e to ordinary flat plastic film or sheeting, rather than to bubble material. This may be used to produce an envelope, or may be used in respect of objects in general, in which sheets of various materials are joined together.

In general, the invention may be considered for joining two materials where (a) one of the materials has the characteristic that, when pressed by a point, the material is punctured, right through (like kraft, and most kinds of paper); and (b) the other material has the characteristic that, when pressed by the same point, the material stretches beyond its elastic limit, and yields, but is not punctured (like polyethylene and other plastics). The second material should be thermoplastic, i.e when heated, and then cooled, the material loses its previous shape and takes on a new shape. With this combination of characteristics, and with some experimentation as to temperatures, squeeze times, etc, satisfactory joints can be made in very many cases. The technique makes use of the application of heat, but the resulting bond is basically a mechanical one. No adhesives or coatings are required.

In place of kraft paper, the technique may be used to join cardboard to polyethylene bubble, or flat film. Cardboard is more difficult to work with, since its heat capacity is greater than paper, i.e cardboard takes longer to heat up. Cardboard, and many other materials, and combinations of materials, need careful control of temperature. There may be only a few degrees of margin between not hot enough (to fuse and seal the material) and being too hot (which causes burning).

With some materials, the piercing stage should be done with the piercing points-dies cold; with other materials, the points-dies may be, or should be, hot. The designer should carry out experiments with the particular materials, to determine what will be satisfactory in the particular case.

When the piercing is done with points-dies that are hot, it may be possible, with some materials, to combine the thermoplastic fusing stage with the piercing stage, whereby the described subsequent separate hot-squeeze stage may be eliminated. In that case, of course the appearance of the bonded area will be different, in that, if the area of the joint is not hot-squeezed flat, the as-finished joint is left with the form of the indentations caused by the points still present.

The designer should also experiment with the depth of penetration of the points. The penetration should be deep enough that the points prick right through the paper-like material, and leave the plastic material, not torn, but stretched. The penetration should-be just deep enough that only the tips of the points break through; where the one material is fibrous, it is preferred not to break or tear, but rather just to separate, the fibres.

The pierce-and-fuse technique enables sheet polyethylene to be joined to the very strong, synthetic fibrous smooth-finished material, which is used in some kinds of courier envelope. The material is known by the (Dupont) trade name Tyvek. Tyvek material can be glued to itself, to form seams, for the purposes of manufacturing the courier envelope. But polyethylene cannot practically be welded or bonded to Tyvek (nor to many other materials) by the use of glue or adhesive. Only by the addition of very expensive additives to the adhesives can polyethylene be glued at all, to most paper-like materials, and the finish of Tyvek makes it even less amenable. Also, as mentioned, in order to join polyethylene to paper or paper-like materials, it is sometimes preferred to pre-laminate a coating of polyethylene right into the paper; but again, this is hardly practicable with Tyvek.

But still, it is very desirable to provide an inner bag of bubble, secured inside a courier envelope of Tyvek, and the pierce-and-fuse technique enables this. The bag made of plastic bubble liner may be attached only at the marginal edges, and so is separable for re-cycling. The plastic liner bag may alternatively be done in plain polyethylene sheet or film.

As mentioned, the technique can be used to join sheet polyethylene to sheet cardboard. This is useful in the case of substances (including foodstuffs) that are commonly stored in plastic liner bags inside cardboard boxes. Fixing the plastic bag to the cardboard has been very difficult, using traditional adhesives and like techniques.

When gluing food containers, the designer must make sure the adhesives do not release spurious chemical contaminants into the food. Acceptable adhesives for gluing cardboard food boxes, and acceptable adhesives for gluing plastic food bags, are readily available; but inexpensive practical safe acceptable adhesives for gluing polyethylene to cardboard are not. However, the pierce-and-fuse technique is a mechanical, rather than an adhesive, jointing system; the technique does not tend to introduce any chemicals that might be toxic in the context of foodstuffs.

The technique does not require that materials be pre-coated, and the technique can be used in cases where the material, for other functional reasons, has a pre-coat of a material that is not compatible with practical adhesives. Furthermore, adhesives usually require time to cure or set whereas the present technique the joint bond simply sets as it cools, as in welding.

The as-illustrated (FIG. 6) pyramid form on the points-dies is advantageous from the standpoint that the multi-pyramid shapes can be machined into the die-faces simply by running a suitably profiled grinding wheel over the die-face. The pyramids thus produced have a sharp point, and each pyramid also has four sharp side-edges. The sharp point penetrates through the paper, but these sharp side-edges do not cut (i.e shear) through the paper; rather, the sharp side-edges may be regarded as creasing the paper and thereby concentrating the squeezing force, as the dies are brought together, into a narrow line, and pressing the materials together in very intimate contact over that narrow line.

Thus, the pyramid form, in addition to providing the pierced points, also provides lines of intimate contact between the two materials, around the pierced points. This may be contrasted with, for example, the needles-style of points-dies, as shown in FIGS. 10,11, which provide only pierced points, but do not provide lines of intimate contact around the pierced points. The presence of the lines of intimate contact may be expected to enhance the security of the final fused joint.

The dies as described in the prior disclosure were flat-slab dies. However, it can be inconvenient to provide for the flat-slab dies to advance in the direction in which the materials are being fed through the dies. Therefore, the bonding of the joints was done on a stop and start basis. The materials were fed between the flat-slab dies and then the material stops while the dies are in actual operation. On the other hand, using dies in the form of rollers allows the materials being bonded to be fed through the rollers on a continuous basis; but it can be difficult, using rollers, to hold a joint in a squeezed-together configuration, for longer than a moment.

Continuous throughput, without stopping and starting, is desirable, as is holding the joint together for a time period of several seconds. These conflicting functions can be met if the dies are arranged to move on tracks, in which the dies are mounted on a flexible carrier having a return. Alternatively, the dies can be solid, but mounted on a linkage which allows the die to travel along with the materials; then, upon being withdrawn from the joint area, the die can be returned by the linkage.

As mentioned, the points should be arranged to penetrate right through the paper—and, when the items being joined are sandwiched between two sheets of paper, through both sheets of paper—to the extent that pinpoints of light would be visible if the joint area were to be held up to the light. In fact, these pinpoints of light can serve as the basis for an inspection technique. To do this, the pierced area is passed under a light source, and a sensor determines the extent to which light shines through. If the pinpoints are too small, or too large, or uneven, the machine can be stopped, and adjustments made. Or, the adjustments can be done automatically, responsively to the sensor signals. Often, the only adjustment required is in respect of the distance apart of the dies as they close together, or bottom out, and the extent to which the dies squeeze the sandwich is readily adjusted by the insertion of appropriate die-closure shims.

Figure 12A:
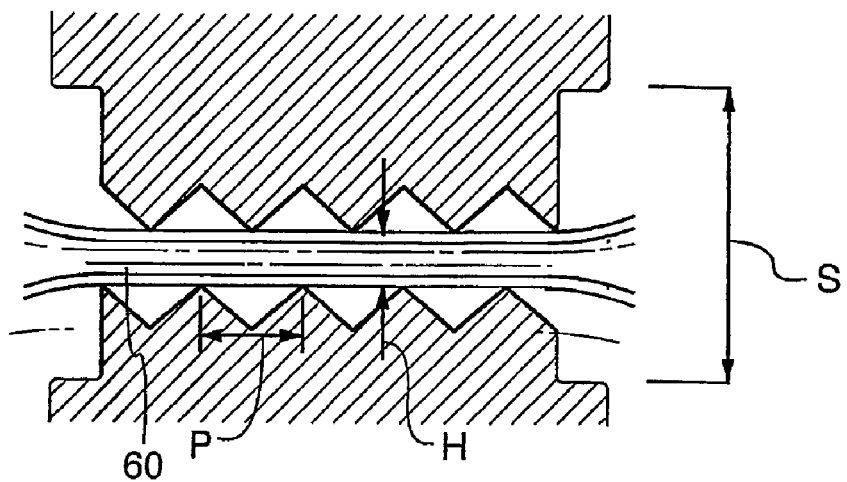
FIG. 12a is a diagram illustrating a slack-take-up position of the dies.
Figure 12B:
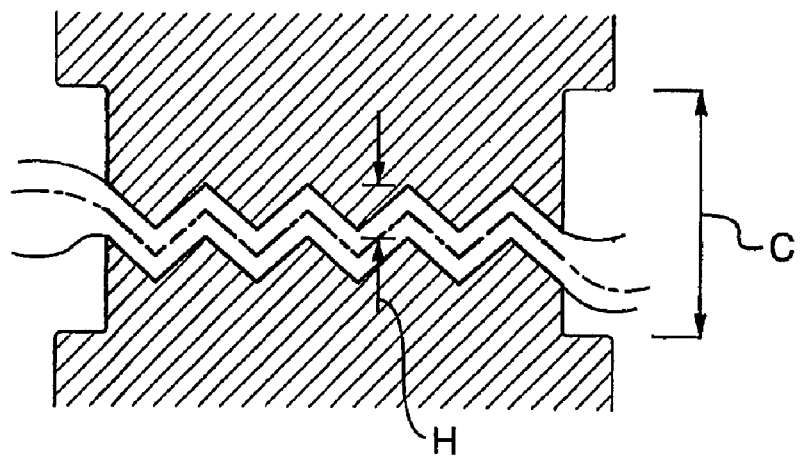
FIG. 12b is a diagram illustrating a closed-together position of the dies.

As shown in FIGS. 12a,12b, the upper and lower points-dies have been brought together until the points just touch a stack 60 of sheets. Insofar as the sheets include bubble material, the bubbles are collapsed, in the drawings, whereby the thickness H of the stack is the aggregate of the thicknesses of the material itself of each sheet. The points-dies now lie a reference-distance S mm apart. In FIG. 12b, the points-dies have been closed together, whereby now the material-thickness of the stack 60 is compressed between the dies, and of course, the sheets that make up the stack have been stretched over the points. The points-dies now lie a distance C apart. Thus the dies have moved together a distance S−C=M. The designer should arrange the dimensions of the points such that the distance M is about one mm.

The type of kraft paper used for bubble envelopes typically is 0.1 mm thick, and the polyethylene film from which the bubble is made typically is about 0.05 mm thick. It has been found that, with a stack of two sheets of kraft paper, and two sheets of bubble film, when the distance M is about one mm, the points just break right through the paper, and also cause the polyethylene of the bubble film to be stretched almost ideally in the manner as shown in FIG. 8. The plastic film is stretched beyond its elastic limit, and takes a permanent set, as the crowns are pushed through the holes punctured in the paper. If the distance M were more than about two mm, too much of the paper would be torn, which might weaken the envelope; if M were less than about a half-mm, the points would not break through the paper reliably.

If the points were to be pushed too far through the paper, the paper might be weakened. Each of the punctured points in the paper preferably should be surrounded by a bridge of intact paper, forming a continuous ring around the point. (This does not apply to the points at the very edge of the paper, of course.) The continuous ring around each point should be nowhere less than one mm wide.

Figure 13:
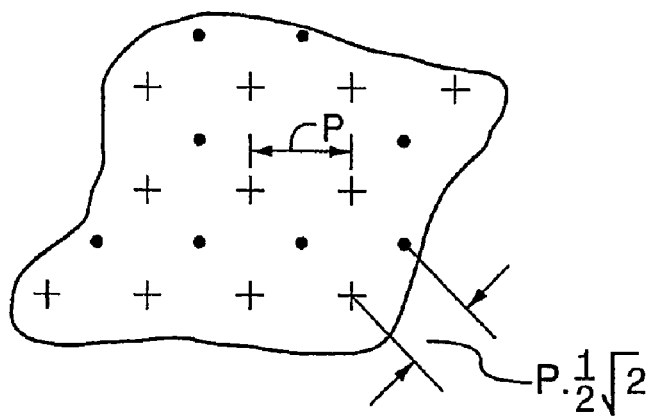
FIG. 13 is a diagram illustrating a layout of points.

FIG. 13 is a plan view of a grid of points, where the grid spacing between adjacent points, as produced by one of the points-dies, is P mm. The points produced by upper points-die (the up-points) are shown as dots, whereas the points produced by the lower points-die (the down-points) are shown as crosses. The up-points protrude downwards into the paper, whereas the down-points protrude upwards out of the paper. It will be understood that the point-to-point spacing of the grid of points, as a whole, now is P1. Assuming the dies (i.e the points) are accurately identical, orthogonal, and symmetrical, the distance P1 is $P.\frac{1}{2}\sqrt{2}$ mm.

The invention claimed is:

1. Procedure for attaching a sheet of puncturable-material to a sheet of stretchable-material, including:
   wherein the puncturable material is material that, upon being forcefully stretched over a point, is readily through-punctured, substantially without stretching;
   wherein the stretchable material is material that, upon being forcefully stretched over a point, readily stretches over the point, substantially without being through-punctured by the point;
   making a stack of sheets of puncturable material and stretchable material, in which the sheets lie in direct face-to-face touching contact with each other;
   providing a points-die;
   wherein a points-area of the points-die has many protruding points, which point towards the stack;
   wherein the points-area lies over, and thereby defines, an adherence-area of the stack;
   pressing and squeezing the points-die onto the adherence-area of the stack;
   then separating the stack from the points-die; and
   so configuring the points, and so squeezing the points-die onto the stack, that:
   at least some of the paints break through, and make holes right through, the puncturable material; and
   substantially none of the points breaks through, and makes holes right through, the stretchable material.

2. Procedure of claim 1, wherein substantially all of the points break through, and make holes right through, the puncturable material.

3. Procedure of claim 1, including so configuring the points, and so squeezing the points-die onto the stack, that, when the stack is squeezed by the points-die, crowns of the stretchable material become stretched over the points far enough for the stretchable material to be stretched beyond its elastic limit, and to take a permanent set.

4. Procedure of claim 3, including:
   providing a flattening-die;
   after separating the stack from the points-die, placing the flattening-die against the adherence-area of the stack;
   squeezing the adherence-area of the stack with the flattening-die, in such manner as to flatten the adherence-area.

5. Procedure of claim 1, wherein the puncturable material is characterised as a paper material, for example kraft paper.

6. Procedure of claim 1, wherein the puncturable material is a light, strong, tear-resistant, synthetic-fibrous, smooth, paper-like material.

7. Procedure of claim 1, wherein the stretchable material is characterised as a plastic film material, for example polyethylene film.

8. Procedure of claim 1, wherein the stretchable material is bubble material, in which a base layer of plastic film material is adhered over part of its surface area to a bubble layer of plastic film material, leaving bubbles therebetween.

9. Procedure of claim 1, wherein the stack is comprised of the following sheets of the materials; puncturable; stretchable; stretchable; puncturable.

10. Procedure of claim 1, wherein the puncturable material is a metal foil material, for example aluminum foil.

11. Procedure of claim 1, including providing an upper points-die and a lower points-die, wherein:
   the upper and lower points-dies have respective points-areas, which are co-extensive with the adherence-area of the stack;
   the points-area of the upper points-die has many protruding points, being the upper points, which are pitched on a grid a distance P mm apart;
   the points-area of the lower points-die has many protruding points, being the lower points, which are also pitched on a grid the said distance P mm apart;
   the upper points lie in a staggered relationship with respect to the lower points;
   the upper points fit into the spaces between the lower points when the points-dies are brought together;
   upon the points-dies being pressed and squeezed onto the adherence-area, up-points on the adherence-area produced by the upper points lie intercalated with down-points on the adherence-area produced by the lower points;
   whereby the up-points and the down-points, on the adherence-area of the stack, together lie pitched on a grid a distance $P.\frac{1}{2}\sqrt{2}$ mm apart.

12. Procedure of claim 11, wherein the configuration of the points-dies is such that:
   the points-dies have a slack-take-up separation, being S mm, being the separation of the points-surfaces at which a flat layer of material having a thickness of H mm lies between, and just touching, the upper and lower points-surfaces, without the material of the layer being stretched over the points;
   the points-dies have a closed-together separation, being C mm, being the separation of the points-surfaces at which the dies lie closed together onto the flat layer of thickness H mm;
   and the distance the points-dies move together, in going from a separation of S mm to a separation of C mm, being S–C, is M mm;
   and M mm is between ½ mm and 2 mm.

13. Procedure of claim 11, wherein the points are pitched a distance P apart, P being the closest distance between adjacent points, where P is between 1½ mm and 5 mm.

14. Procedure of claim 11, wherein the points are provided on the points-surface of the points-die as pointed pyramids.

15. Procedure of claim 14, wherein the pyramids are regularly-pitched, on a grid in which the pyramids are pitched a distance P apart, where P is between 1½ mm and 5 mm.

16. Procedure of claim 11, including the following procedure for manufacturing the points-dies:
   passing a cutting wheel, having a V-shaped cutting profile, in such manner as to form V-shaped grooves, over the points-die in a first direction, and passing a cutting wheel, having a V-shaped cutting profile, over the die in a second direction:
   wherein the second direction is orthogonal to the first direction;
   and making the grooves deep enough that pointed pyramids are left between the grooves.

17. Procedure of claim 16, wherein the V-shaped profile has an included angle of between 90 degrees and 60 degrees.

18. Procedure of claim 1, wherein:
   the puncturable material is characterised as a paper material, for example kraft paper;
   the stretchable material is bubble material, in which a base layer of plastic film material is adhered over part of its surface area to a bubble layer of plastic film material, leaving bubbles therebetween;
   the stretchable material is bubble material, in which a base layer of plastic film material is adhered over part of its surface area to a bubble layer of plastic film material, leaving bubbles therebetween; and
   the stack is comprised of the following sheets of the materials: paper; bubble; bubble; paper.

19. A padded bubble envelope that has been manufactured by the procedure of claim 18, in which the adherence-area is free of glue or adhesive.

20. Procedure for attaching a sheet of puncturable-material to a sheet of stretchable-material, including:
  wherein the puncturable material is material that, upon being forcefully stretched over a point, is readily through-punctured, substantially without stretching;
  wherein the stretchable material is material that, upon being forcefully stretched over a point, readily stretches over the point, substantially wIthout being through-punctured by the point;
  making a stack of sheets of puncturable material and stretchable material, in which the sheets lie in direct face-to-face touching contact with each other;
  providing a points-die;
  wherein a points-area of the points-die has many protruding points, which point towards the stack;
  wherein the points-area lies over, and thereby defines, an adherence-area of the stack;
  pressing and squeezing the points-die onto the adherence-area of the stack;
  then separating the stack from the points-die; and
  pressing the points-die hard enough to puncture the puncturable-material immediately over the points, but lightly enough to leave a bridge of the puncturable material still intact, between the points.

21. Procedure of claim 20, including:
  wherein some of the points are edge-points, being those points in respect of which no other one of the points lies nearer to an edge of the stack;
  pressing the points-die onto the stack in such manner that, upon the stack being separated from the points-die, in respect of each of the points that is not an edge-point, there remains a bridge of intact material between adjacent points;
  and the bridge forms a continuous ring around each one of the points.

22. Procedure of claim 21, wherein, in respect of each point, the continuous ring is nowhere less than 1 mm wide.

23. Procedure for attaching a sheet of puncturable-material to a sheet of stretchable-material, including:
  wherein the puncturable material is material that, upon being forcefully stretched over a point, is readily through-punctured, substantially without stretching;
  wherein the stretchable material is material that, upon being forcefully stretched over a point, readily stretches over the point substantially without being through-punctured by the point;
  making a stack of sheets of puncturable material and stretchable material, in which the sheets lie in direct face-to-face touching contact with each other;
  providing a points-die;
  wherein a points-area of the points-die has many protruding points, which point towards the stack;
  wherein the points-area lies over, and thereby defines, an adherence-area of the stack;
  pressing and squeezing the points-die onto the adherence-area of the stack;
  then separating the stack from the points-die;
  providing an upper points-die and a lower points-die, wherein:
  the upper and lower points-dies have respective points-areas, which are co-extensive with the adherence-area of the stack;
  the points-area of the upper points-die has many protruding points, being the upper points, which are pitched on a grid a distance P mm apart;
  the points-area of the lower points-die has many protruding points, being the lower points, which are also pitched on a grid the said distance p mm apart;
  the upper points lie in a staggered relationship with respect to the lower points;
  the upper points fit into the spaces between the lower points when the points-dies are brought together;
  upon the points-dies being pressed and squeezed onto the adherence-area, up-points on the adherence-area produced by the upper points lie intercalated with down-points on the adherence-area produced by the lower points;
  whereby the up-points and the down-points, on the adherence-area of the stack, together lie pitched on a grid a distance P.½√2 mm apart;
  after the points-dies have been pressed and squeezed onto the adherence-area, the puncturable material remains intact, and not punctured, over a bridge portion of +the puncturable material, between the up-points and the down-points;
  and the un-punctured bridge portion is at least 1 mm wide.

24. Procedure for attaching a sheet of puncturable-material to a sheet of stretchable-material, including:
  wherein the puncturable material is material that, upon being forcefully stretched over a point, is readily through-punctured, substantially without stretching;
  wherein the stretchable material is material that, upon being forcefully stretched over a point, readily stretches over the point, substantially without being through-punctured by the point;
  making a stack of sheets of puncturable material and stretchable material, in which the sheets lie in direct face-to-face touching contact with each other;
  providing a points-die;
  wherein a points-area of the points-die has many protruding points, which point towards the stack;
  wherein the points-area lies over, and thereby defines, an adherence-area of the stack;
  pressing and squeezing the points-die onto the adherence-area of the stack;
  providing a flattening-die;
  after separating the stack from the points-die, placing the flattening-die against the adherence-area of the stack;
  squeezing the adherence-area of the stack with the flattening-die, in such manner as to flatten the adherence-area.

25. Procedure of claim 24, including:
  providing the stretchable-material as a thermoplastic material, having a thermoplastic temperature threshold;
  heating the material above the said threshold;
  while the material remains above the said threshold, squeezing the adherence-area of the stack with the flattening-die;
  then separating the stack from the flattening-die, and allowing the material to cool.

26. Procedure for attaching a sheet of puncturable-material to a sheet of stretchable-material, including:
  wherein the puncturable material is material that, upon being forcefully stretched over a point, is readily through-punctured, substantially without stretching;
  wherein the stretchable material is material that, upon being forcefully stretched over a point, readily stretches over the point, substantially without being through-punctured by the point;
  making a stack of sheets of puncturable material and stretchable material, in which the sheets lie in direct face-to-face touching contact with each other;
  providing a points-die;
  wherein a points-area of the points-die has many protruding points, which point towards the stack;

wherein the points-area lies over, and thereby defines, an adherence-area of the stack;

pressing and squeezing the points-die onto the adherence-area of the stack;

then separating the stack from the points-die; and wherein:

the stack is comprised of the following sheets of the materials: puncturable; stretchable; stretchable; puncturable;

the sheets of material are arranged in the stack so as to form the front and back of an envelope, having left and right edges and a bottom edge, which are closed, and having a top edge, which is open, and which includes a fastener for closing the envelope;

the adherence-area is a relatively-narrow continuous marginal area, contiguous with the left, right, and bottom edges;

the procedure is carried out in such manner as to ensure that, over at least a major proportion of the total area of the stack of sheets, the sheets are not adhered together.

27. An envelope that has been manufactured by the procedure of claim 26.

* * * * *